United States Patent [19]
Nelson, Jr.

[11] 3,755,871
[45] Sept. 4, 1973

[54] COMPONENT ASSEMBLER AND METHOD

[76] Inventor: William B. Nelson, Jr., 226 Nevada Dr., West Monroe, La. 71201

[22] Filed: June 29, 1972

[21] Appl. No.: 267,510

[52] U.S. Cl............ 29/200 A, 29/208 R, 29/211 R, 29/430, 227/100
[51] Int. Cl.......................... B23p 19/00, B23q 7/10
[58] Field of Search...................... 29/200 A, 200 B, 29/200 J, 208 R, 211 R, 430; 227/100

[56] References Cited
UNITED STATES PATENTS

| | | | |
|---|---|---|---|
| 2,037,817 | 4/1936 | Paxton | 227/50 |
| 3,207,403 | 9/1965 | Stoddard et al. | 227/101 |
| 3,228,580 | 1/1966 | Washington et al. | 227/101 |
| 3,508,672 | 4/1970 | Stanoy et al. | 214/41 |
| 3,557,439 | 1/1971 | Dykeman | 29/200 A X |
| 3,567,099 | 4/1971 | Winters | 227/100 |
| 3,591,067 | 7/1971 | Vial | 227/84 |

Primary Examiner—Thomas H. Eager
Attorney—Norvell E. Von Behren

[57] ABSTRACT

A unique automatic assembling machine and method for use in the formation of pallets and other structures wherein fabricated stringer and solid stringer type pallets may be quickly and automatically formed and assembled. A partial pallet or a complete pallet may be formed in the machine which comprises new and novel means for feeding the stringers into the machine and positioning them at a pre-determined position in the machine. While the stringers are being positioned, the pallet deck boards are automatically delivered, unscrambled and accurately fed sequentially onto the stringers at the proper location for later fastening together.

The unique concept of the invention may also be utilized in the formation of other structures such as boxes, crates and the like with minor modifications in the machine.

11 Claims, 12 Drawing Figures

Patented Sept. 4, 1973

Patented Sept. 4, 1973  3,755,871

COMPONENT ASSEMBLER AND METHOD

BACKGROUND OF THE INVENTION

This invention relates generally to an automatic assembling machine and particularly to a new and novel component for a pallet machine wherein a partial pallet may be quickly and inexpensively assembled. When two of the novel components are utilized together, a complete pallet may also be assembled in the same efficient manner.

Fabricated transportation and storage pallets may be constructed by fastening a plurality of deck boards to the top and bottom of a plurality of stringers. These stringers may be of the type generally known as solid stringers or of the type generally known as fabricated or block stringers and heretofore the completed pallet has been generally assembled entirely with manual labor using only automatic fastening devices such as staple guns to complete the pallet.

One such example is typically shown in the U.S. Pat. No. 3,207,403, issued Sept. 21, 1965 to C.F. Stoddard et al. which teaches an automatic nailing device for fastening the deck boards to the stringers of the pallet so that the nails will be staggered relative to the longitudinal axis of the stringer thereby preventing cracking of the stringer.

A further improvement on the before mentioned automatic nailing technique is shown in the U.S. Pat. No. 3,591,067, issued July 6, 1971, to Garye R. Vial wherein a jig is provided for positioning the pallet components prior to the automatic nailing of them into place. In this prior art device, as with others before the introduction of the subject invention, the pallet components are all positioned manually on the jig with the jig serving only as a guide for rapidly aligning the parts before automatically nailing them in place.

These prior art techniques have also been utilized in the home building industry as typified by the U.S. Pat. No. 3,228,580, issued Jan. 11, 1966 to G. D. Washington et al. wherein a combination of jigs and an automatic nailing machine have been combined to assemble pre-fabricated wall sections and panels which also were positioned by hand on the device. Somewhat similar techniques have been used in the manufacture of bed frames as shown in the U.S. Pat. No. 3,567,099, issued Mar. 2, 1971 to Thomas F. Winters with the refinement added of reciprocating the bed frame in order to be able to stagger the nails at each joint.

All of the before mentioned prior art patents, while providing for the rapid nailing of the components, did not provide means for automatically supplying and positioning the article components prior to the nailing step which is essential if the completed articles are to be efficiently assembled. A somewhat automated positioning of slats for use in a box nailing device was attempted in the U.S. Pat. No. 2,037,817, issued Apr. 21, 1936 to H. Paxton where the patentee provided a slat storage magazine which was hand loaded by the machine operator and which fed slats to a position below the nail chucks. Since the magazine had to be hand loaded the efficiency of the machine was dependent upon the efficiency of the loading operator.

While it is known to provide automatic feeding devices for various manufacturing processes, as evidenced by the U.S. Pat. No. 3,508,672, issued Apr. 28, 1970 to M. Stanoy et al., these methods have never been adapted to the manufacturing of pallets in the manner taught by the applicant's device to thereby provide the new and novel pallet assembling machine.

SUMMARY OF THE INVENTION

In order to overcome the problems inherent in the prior art devices, there is provided by the subject device a new and unique machine which may be used to automatically assemble a partial pallet of either the fabricated block type or the solid stringer type. When the machine of the invention is combined with a similar machine, the two units may be used to automatically assemble the complete pallet.

The unique machine comprises basically an automatic bulk stringer supply and feeder used in combination with an automatic deck board supply and unscrambler which is located above the stringer supply. These two supply members are interconnected in such a manner that the components may be accurately positioned together for manual or automatic nailing tp thereby provide a partial pallet. When the partial pallet is turned over and introduced into a similar second pallet assembler the completed pallet is automatically formed with the components also being automatically supplied, positioned and assembled.

Also provided in the machine is a unique means for aligning the deck boards prior to their entry into a deck board hopper provided on the machine.

Accordingly it is an object of the invention to provide a new and novel pallet assembling machine that may be used to form a partial pallet or may be used to form a complete pallet.

Another object of the invention is to provide a new and novel pallet assembling machine that may be used interchangeably with fabricated stringers, solid stringers and partial pallets.

Still another object of the invention is to provide a new and novel pallet assemblingmachine that has new and unique provisions for automatically unscrambling the deck boards and aligning them prior to positioning them on the pallet stringers or on a partial pallet.

Yet another object is to provide a new and novel component for a machine that can quickly supply, unscramble and accurately align a plurality of boards in a pre-determined position on top of another plurality of boards so that the boards may be fastened together to form an assembled structural product such as a pallet, box, crate or the like.

These and other objects and advantages of the invention will become apparent from a reading of the description of the preferred embodiment and from a review of the drawings showing the invention.

DESCRIPTION OF THE PREFERRED EMBODIMENT

Figures 1, 2, 3:
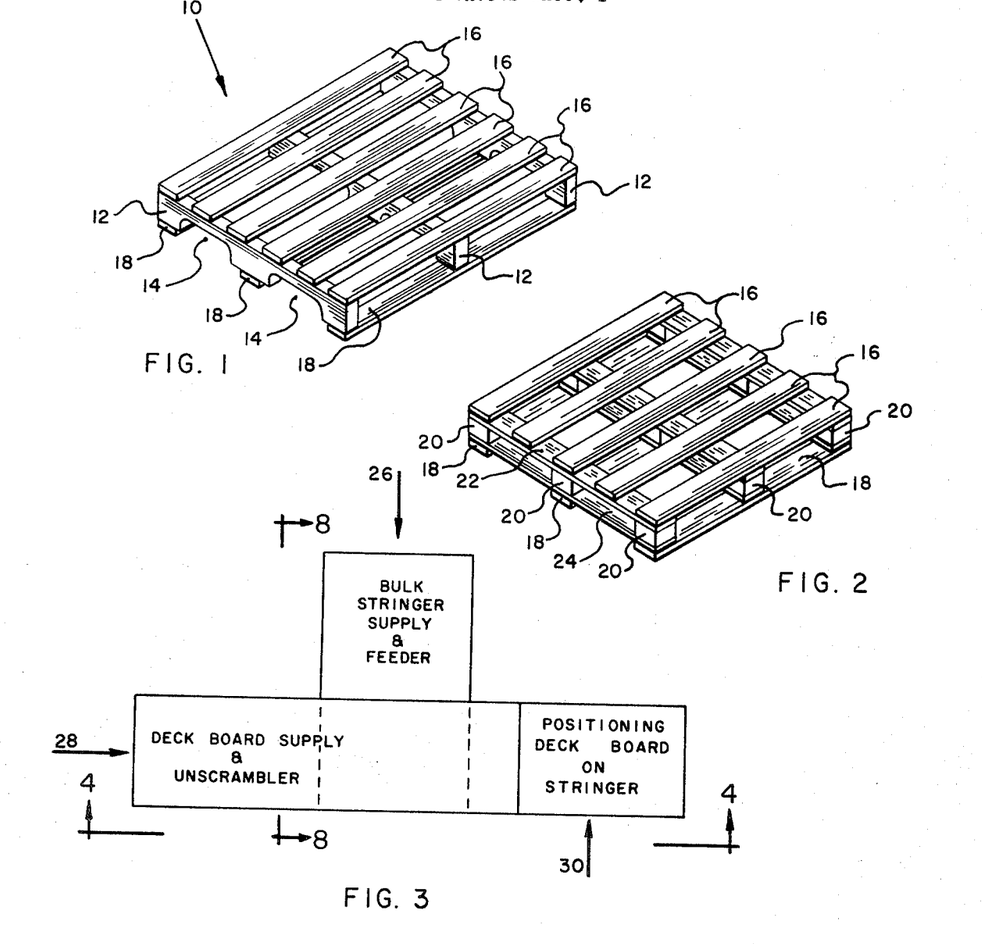
FIG. 1 is a perspective view of a solid stringer type pallet as assembled on the automatic machine of the invention.
FIG. 2 is a perspective view of a fabricated or block stringer type pallet as assembled on the automatic machine of the invention.
FIG. 3 is a top view, in block diagram form, showing the basic components of the automatic assembling machine of the invention used for assembling a partial pallet.

Referring now to the drawings in general and in particular to FIG. 1 and 2 of the drawings, there is shown perspective views of the two types of pallets that may be assembled on the automatic machine of the invention. The pallet shown in FIG. 1 generally by the numeral 10 is known in the art as a solid stringer pallet and comprises a plurality of solid stringers 12 which have a plurality of notch receiving openings 14 formed in the side thereof by means well known in the art. The stringers 12 have a plurality of top deck boards 16 nailed to their upper edge and a plurality of bottom deck boards 18 nailed to their lower edge.

The pallet shown in FIG. 2 is known as a fabricated or block stringer type pallet and also comprises a plurality of top deck boards 16 and a plurality of bottom deck boards 18 which are in turn nailed to a fabricated or block type stringer which comprises a plurality of blocks 20 having a plurality of top boards 22 and a plurality of bottom boards 24 nailed to the blocks 20 by means well known in the art. When constructed in this manner the blocks 20 in combination with the top boards 22 and the bottom boards 24 form the fabricated stringer of this type of pallet.

Referring now to FIG. 3 of the drawing there is shown in block diagram form the basic components of the automatic assembling machine of the invention which may be used to assemble a partial pallet, a complete pallet, boxes, crates and the like. The machine comprises basically three components shown by the numerals 26, 28, and 30 with the first component 26 being the bulk stringer supply and feeder which supplies and feeds the bulk stringers, either solid or fabricated, into the basic machine. Positioned above the bulk stringer supply and feeder is the second component of the assembling machine which comprises the deck board supply and unscrambler 28 which functions to supply the necessary quantities of deck boards needed to complete the pallet and to unscramble the deck boards so that they may be placed one at a time on the pallet by the assembling machine.

The third basic component of the machine is the positioning mechanism 30 for positioning the deck boards on the pallet stringers so that they may later be nailed either automatically or manually as the owner of the machine desires.

Figure 4:
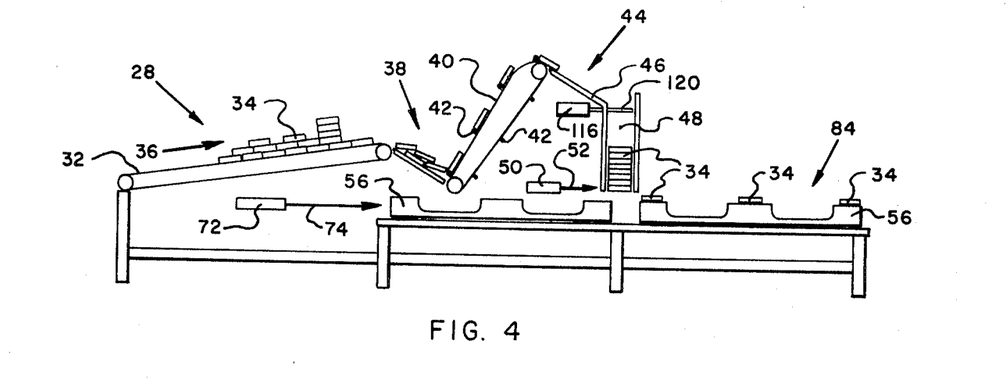
FIG. 4 is a simplified side view, taken along line 4—4 of FIG. 3, showing the basic components shown in FIG. 3.

Referring now to FIG. 4 of the drawing there is shown a simplified side view taken along line 4—4 of FIG. 3 showing, in a simplified manner, the basic components shown in FIG. 3. The deck board supply and unscrambler 28 comprises generally an inclined conveyor 32 upon which a supply of deck boards 34 may be placed to be carried upwardly in the direction shown by the arrow 36. The deck board conveyor 32 may be motor-driven or may be driven by other power means well known in the art and forming no part of the invention.

The deck board conveyor 32 feeds the supply of the deck boards 34 into a first deck board hopper shown generally by the numeral 38, which terminates at a second deck board conveyor 40 which is inclined also in a manner similar to the first deck board conveyor 32 but at a somewhat steeper angle as shown in FIG. 4 of the drawing. The second deck board conveyor 40 has formed on the conveyor chain thereof a plurality of lugs 42 which serve to pick up the deck boards 34 one at a time, from the first deck board hopper 38 and to carry the deck boards to the second deck board hopper shown generally by the numeral 44. The second deck board conveyor may also be driven by an electric motor or may be driven by other power means well known in the art and forming no part of the invention.

The first deck board hopper 38 in combination with the second deck board conveyor 40 form the means for unscrambling the deck boards from the deck board supply so that they may be fed, one at a time, into the second deck board hopper 44 which comprises a downwardly inclined frame 46 which terminates in an upstanding hopper structure 48 which receives the unscrambled supply of deck boards as before mentioned. Th hopper 48 also has positive means for controlling the dropping of the deck boards horizontally into the hopper, which will be detailed more fully hereinafter and are shown in the drawing as the numerals 116 and 120.

Formed on the bottom of the hopper structure 48 and attached thereto by means well known in the art is a power cylinder 50 having a power rod 52 attached thereto which is utilized, in a manner to be described more fully hereinafter, to push the deck boards stacked in the hopper 48 one at a time onto the stringers of the pallet which are simultaneously being positioned underneath the hopper 48. In this manner the deck boards are ready to be manually or automatically nailed to the stringers thereby forming a partial pallet.

Figures 8, 11, 12:
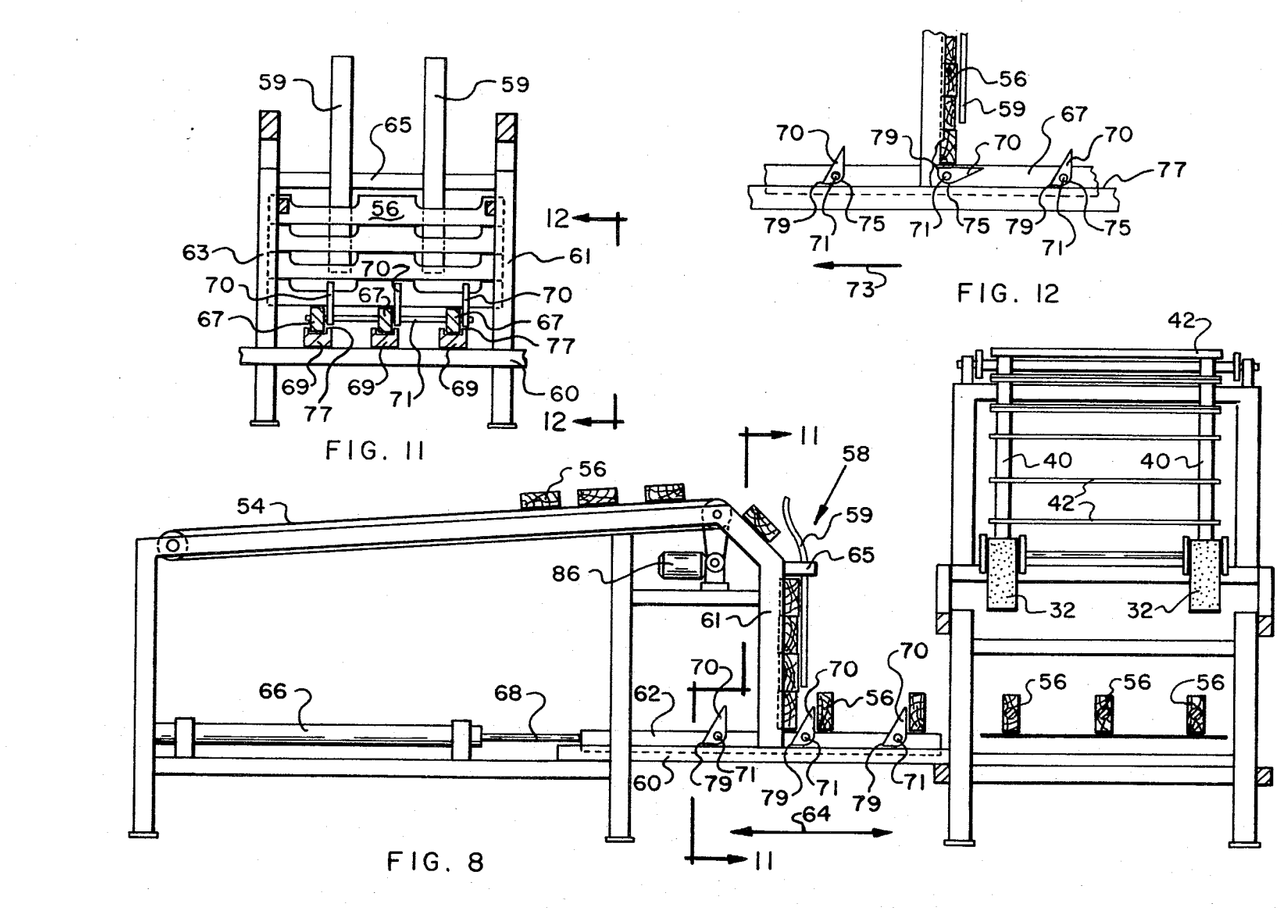
FIG. 8 is a simplified side view, taken along 8—8 of FIG. 3, showing the basic components of the bulk stringer supply and feeder.
FIG. 11 is a sectional view, taken along line 11—11 of FIG. 8.
FIG. 12 is a partial sectional view taken along line 12—12 of FIG. 11.

Referring now to FIG. 8 of the drawing there is shown a simplified side view, taken along line 8—8 of FIG. 3, showing the basic components of the bulk stringer supply and feeder and comprises a generally inclined upwardly traveling bulk stringer conveyor 54 which has placed thereon a supply of stringers 56 which may be either the solid type or the fabricated type as hereinbefore described. The bulk stringer conveyor 54 may be driven by an electric motor 86 or may be driven by other power means well known in the art and terminates at its upper end thereof at a stringer hopper 58 which is formed generally upstanding and is sized to handle the various types of stringers 56 that are fed into the hopper by means of the bulk stringer conveyor 54. The stringers 56 are positioned and aligned in the stringer hopper 58 by means of the guide rails 59 and the side guide frames 61 and 63 as shown more fully in FIG. 11. A cross frame 65 supports the guide rails 59 as well as the side guide frames 61 and 63.

Formed below the stringer hopper 58 and slidably mounted as a frame 60 is a traveling carriage 62 which is designed to move in the direction shown by the arrow 64 and is positioned by means of a power cylinder 66 having attached thereto a power rod 68 by means well known in the art. The traveling carriage 62 also has formed thereon a plurality of retractable pusher fingers 70 which are designed to push the bulk stringers 56, one at a time, from the stringer hopper 58. The pusher fingers are slidably carried by a plurality of slide blocks 67 which in turn slide on a plurality of guide members 69 fixably attached to the frame 60. The slide blocks 67 are fixably attached to each other by means of a plurality of shafts 71. The slide blocks 67 in combination with the retractable pusher fingers 70 and the plurality of shafts 71 form the traveling carriage 62. Referring to FIG. 12 of the drawing there will be seen how the retractable fingers 70 are able to retract whenever the carriage 62 is traveling in the directin shown by the arrow 73. As before mentioned the fingers 70 are pivotably mounted on the shafts 71 and have a lower cam surface 75 which is designed to ride on the upper surface 77 of the guides 69. As a result whenever the carriage 62 moves in the direction shown by the arrow 73 each finger 70 will strike the bottom-most stringer 56 in the hopper 58 and will retract underneath the bottom of the stringer, whereupon it will return to its pushing position by virtue of its being spring loaded or biased by other means not shown in the drawings. When the carriage 62 reverses its direction to opposite that shown by the arrow 73, the fingers 70 will be firmly fixed with the point 79 riding on the upper surface 77 of the guide 69.

The number of retractable pusher fingers 70 on the traveling carriage 62 determines the number of stringers that are positioned in the assemblying machine for transfer to the deck board hopper. For example, if the pallet is designed to contain three stringers then the traveling carriage 62 will contain three pusher fingers, each of which will push a stringer 56 from the stringer hopper 58 as the traveling carriage 62 moves into position in the assemblying machine.

Referring now back to FIG. 4 of the drawing there can be seen beneath the second deck board conveyor 40 the end stringer 56 of the plurality of stringers that have been positioned in the assemblying machine as hereinbefore described. When the three stringers 56 are positioned in this manner a power cylinder 72 is utilized to push the stringers 56 by means of the power rod 74 fixedly attached to the cylinder 72 by means well known in the art. As the stringers 56 pass underneath the deck board hopper 48 they receive, at the upper position, a deck board which has been controlably ejected from the hopper 48 by means of the power cylinder 50 and the power rod 52 as before mentioned. In this manner the stringer 56 has positioned on the upper surface thereof the desired quantity of deck boards 34 at the proper location where they may be manually or automatically nailed as desired by the owner of the basic machine.

Figure 5:
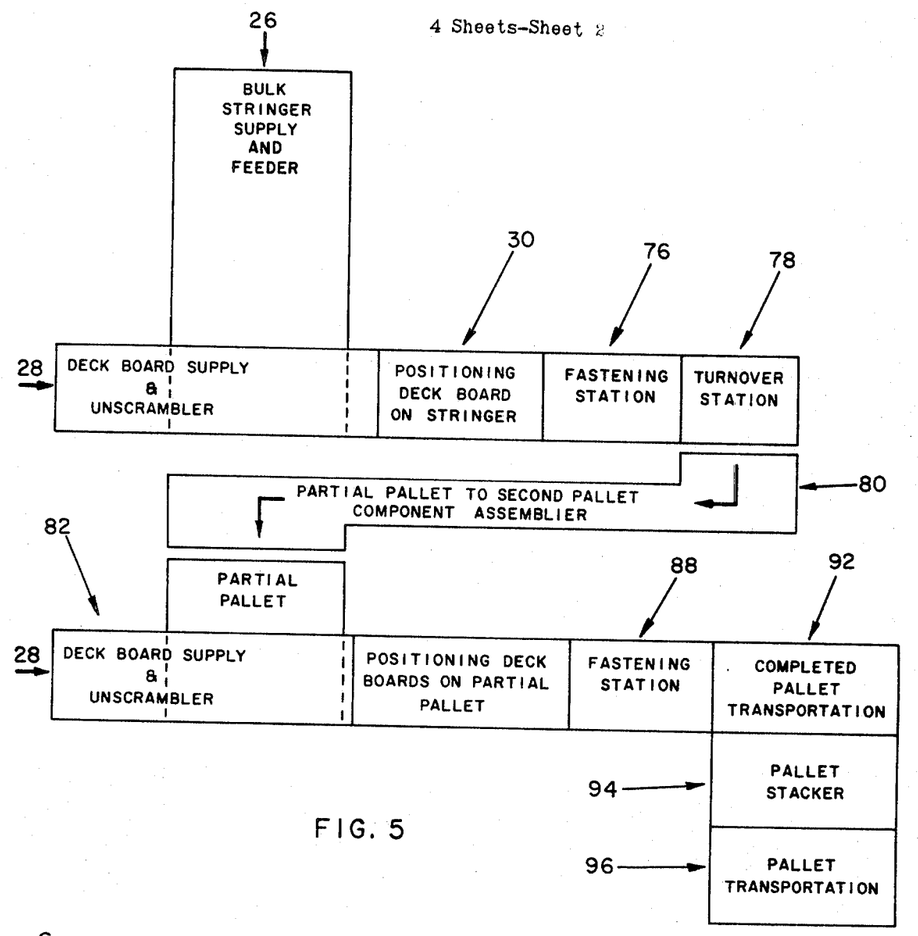
FIG. 5 is a top view in block diagram form, showing two of the basic components of FIG. 3 used together to form an assembling machine for assembling a complete pallet.

Referring now to FIG. 5 of the drawing there is shown a top view in block diagram form, a complete pallet machine which utilizes two of the basic components hereinbefore described together with other components to form a complete machine which may be used to assemble a completed pallet. After the bulk stringer 56 has positioned on the top thereof the predetermined number of deck boards 34, these deck boards may be rigidly fastened to the stringers 56 at the fastening station 76 which may be a manual fastening or an automatic fastening by means of one of the automatic fastening devices hereinbefore described as prior art. Thereafter the partial pallet may be turned over at the turnover station 78 either manually or by means of one of the known turnover devices on the market today. After the partial pallet has been turned over, it may be conveyed, by means of a partial pallet conveyor 80, to the second basic machine, shown generally by the numeral 82, which is similar to the before described basic unit with the exception that the bulk stringer supply and feeder 26 has been modified to handle partial pallets in place of the bulk stringers 56. If space permits, the partial pallet conveyor could be eliminated with the partial pallets being fed directly from the turnover station 78 into the second basic machine 82.

In the second basic machine 82 the deck board supply and unscrambler 28 is essentially the same as before described with the deck boards 34 being conveyed by the conveyor 32 to the first hopper 38 and being unscrambled by the second conveyor 40 whereupon they are conveyed to the second hopper 44 in the form of the hopper structure 48. As before mentioned the bulk stringer supply and feeder section 26 of the basic machine has been modified in the second basic machine to handle partial pallets, shown generally by the numeral 84 in FIG. 4, which pallets have been formed and nailed together in the first basic machine. When modifying the second basic machine 82 the stringer hopper 58 may be enlarged to handle a completed horizontal partial pallet with the pusher fingers 70 being reduced to one in number so that each stroke of the power cylinder 66 and power rod 68 delivers one partial pallet by means of the traveling carriage 62 to the pallets relative position under the deck board supply and unscrambler 28 contained on the basic machine. It may be desired also to eliminate the bulk stringer conveyor 54 along with its motor drive 86, in the interest of economy and to stack the partial pallets by hand in the stringer hopper 58 which has been modified to handle the partial pallets in the second basic machine 82. It is also within the spirit and scope of the invention that the partial pallets 84 may be brought directly into the pusher mechanism 72 and 74 of the main machine thereby eliminating the hopper 58.

Figure 6:
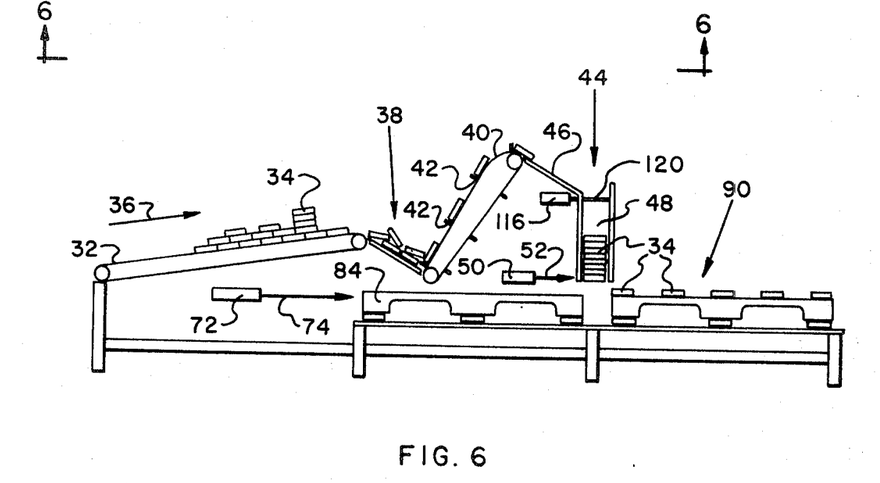
FIG. 6 is a simplified side view, taken along line 6—6 of FIG. 5, showing the basic components of FIG. 3 utilized to assemble the completed pallet.

Referring now to FIG. 6 of the drawing, there is shown, in simplified form, the overturned partial pallet which has been positioned in the basic machine underneath the deck board supply and unscrambler 28 and which is positioned, in a controlled sequence, by means of the power cylinder 72 and the power rod 74. As the partial pallet 84 passes beneath the second hopper 44 the power cylinder 50 and the power rod 52 deliver a predetermined supply of deck boards 34 to the top of the partial pallet 84. Thereupon the partial pallet 84 passes to the fastening station 88 where the top deck boards are fastened either manually or automatically as before detailed in the prior art thusly forming a complete pallet, shown generally by the numeral 90 in FIG. 6.

The completed pallet 90 may then be transported by the pallet transportation device 92, which may be in the form of a conveyor or other known means of transportation, to the pallet stacker 94 which in turn stacks the pallets to a predetermined height whereupon they may then be transported by means of the pallet transportation device 96 to the ultimate storage facility or to a shipping facility. The pallet transportation 96 may be in the form of a conveyor or may be in the form of one of the other known transportation devices.

Figures 7, 9, 10:
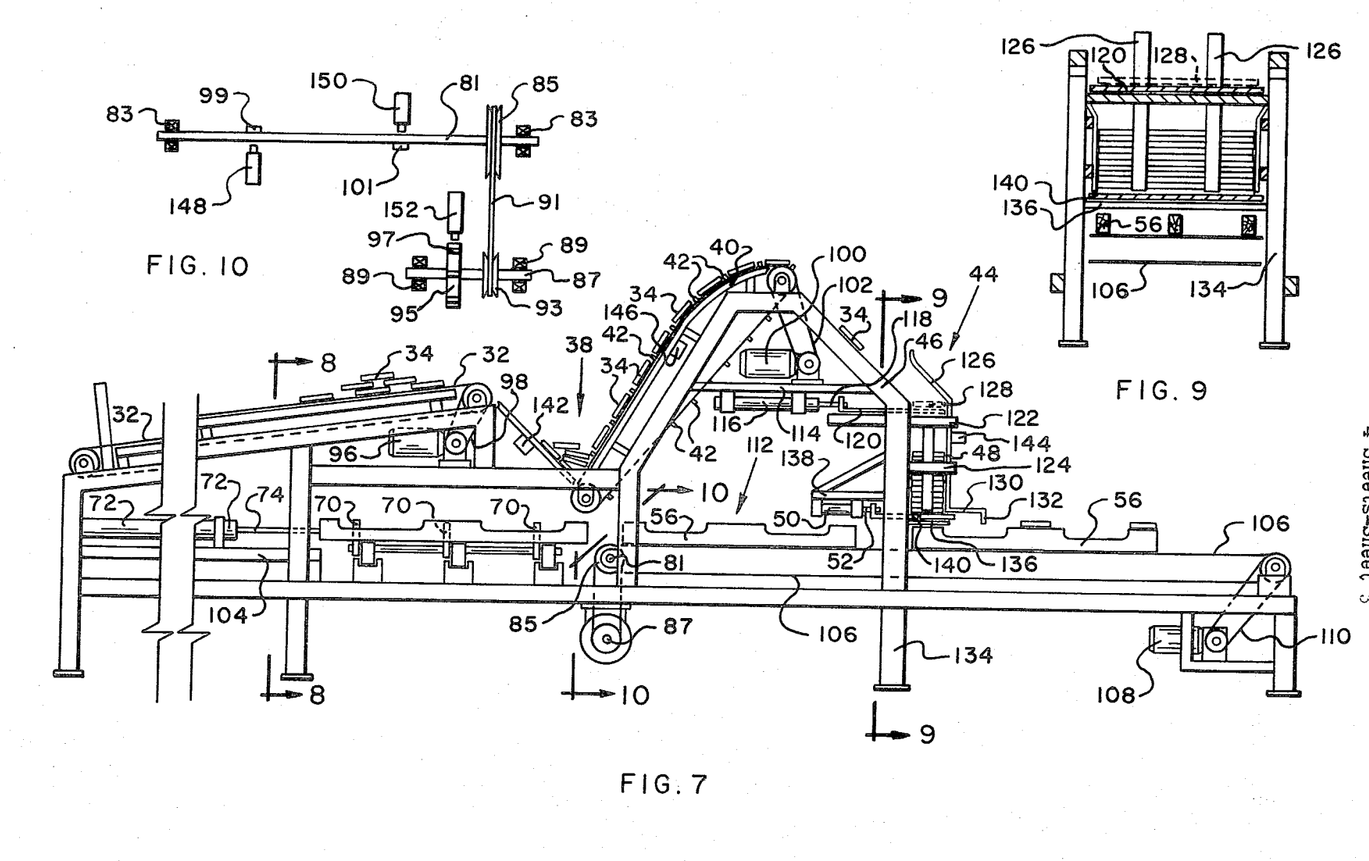
FIG. 7 is a more detailed side view taken along line 4—4 of FIG. 3, showing the individual components of the basic machine of the invention.
FIG. 9 is a sectional view taken along line 9—9 of FIG. 7.
FIG. 10 is an end view, in schematic form, taken along line 10—10 of FIG. 7.

Referring now to FIG. 7 of the drawing there is shown in more detail a side view taken along line 4—4 of FIG. 3 showing the basic machine. There will now be described some of the refinements of the basic machine and control devices which are utilized to coordinate the movements of the various parts of the machine in order to assure that a partial or completed pallet is always formed in the desired manner. The deck board conveyor 32 is driven by a deck board conveyor motor 96 by means of the chain 98 of the type well known in the art. In addition the second deck board conveyor 40 is driven by means of the second deck board motor 100 by means of the chain 102 of the type well known in the art. The power to the deck board conveyor 32 is controlled by means of a micro switch 142 which stops the motor 96 whenever a buildup occurs in the hopper 38. In a like manner, a micro switch 144 in combination with a time delay switch attached thereto, will start the motor 100 whenever the level in the hopper 44 drops below a given set point and will stop the motor whenever it gets above a given point. In this manner the flow of deck boards 34 to the hopper 44 is accurately controlled keeping the hopper 44 with a full reservoir of deck boards and assuring that the stringers have a full compliment of deck boards.

As before mentioned the power cylinder 72 and power rod 74 are utilized to position the stringer 56 beneath the second deck board hopper 44. The power cylinder 72 is mounted on the frame 104 so that its power rod 74 may position the stringers 56 that have been delivered by the pusher fingers 70 to the correct position beneath the hopper 44. When the basic machine herein described is used to assemble a pallet or partial pallet, due to the size of the pallet and the practical limitations in size of power cylinder 72 and pusher rod 74, it may become necessary to also utilize a conveyor 106 to position the pallet. The conveyor 106 may be driven by a conveyor motor 108 and by means of the conveyor motor belt 110 as is well known in the art and is actuated by the main start/stop control for the basic machine. As a result the power cylinder 72 and power rod 74 may be utilized to push the stringers 56 onto the conveyor 106 in the position shown by the numeral 112 in FIG. 7 of the drawings. Thereafter the conveyor 106 will convey the stringers 56 underneath the second hopper 44 in a predetermined time sequence as will be described more fully hereinafter.

Referring now to the second hopper 44 in FIG. 7 there will now be described the manner in which the unscrambled supply of deck boards 34 may be positively positioned within the hopper 44 in a horizontal position without any single deck board being vertical or slightly vertical which would cause a malfunction of the machine. Mounted beneath the motor 100 on the frame 114 is a power cylinder 116 which drives a power rod 118 connected to a sliding plate 120. The sliding plate 120 slides horizontally on a frame 122 into the hopper 44 to completely close off the upper portion of the hopper 44 whenever the power cylinder 116 is in its forwardmost position as shown in FIG. 7 of the drawing. In this manner the sliding plate 120 acts as a gate at the upper portion of the hopper 44 to stop the deck boards 34 from dropping into the hopper 44 in other than a controlled horizontal manner.

The frame 122 also carries the hopper frame 48 along with the frame 124. Formed on the upper edge of the hopper frame 48 is an upwardly inclined guide member 126 which acts in conjunction with the downwardly inclined frame 46 to guide the deck board 34 into the position shown by the dashed lines 128 onto the sliding plate member 120 which has been positioned across the upper portion of the hopper 44 to stop the deck board 34. When the deck board is in the position shown by the dashed lines 128 the power cylinder 116 quickly retracts the power rod 118 causing the sliding plate 120 to also retract and drop the horizontal deck board into its proper horizontal position in the deck board hopper 44. A micro switch 146 mounted beneath the second deck board conveyor 40 is utilized to actuate the power cylinder 116 to retract at a predetermined time whenever actuating cleats (not shown on the drawings) mounted on the conveyor, trip the micro switch. The position of the cleats is set so that the cylinder 116 will quickly retract as soon as a deck board, represented by the dashed lines 128, has arrived on top of the sliding plate 120. By the use of the combination of the sliding plate 120 controlled by the micro switch 146 with the downwardly inclined frame 46 and the upwardly inclined guide member 126 a positive horizontal placement of the deck boards 32 is assured in the deck board hopper 44.

Formed on the lower portion of the hopper frame 48 is a horizontally disposed guide member 130 having a downwardly protruding stop member 132 formed on the end thereof. Also formed on the lower portion of the hopper 44 and rigidly attached to the frame 134 is the bottom plate 136 of the hopper 44. Carried by the frame 134, by means of the frame 138, is the power cylinder 50 which drives a sliding plate 140 by means of the power rod 52. The sliding plate 140 slides on the bottom of the hopper 136 in a horizontal direction and drives the deck boards 34 out of the bottom of the hopper 44 in the manner shown in FIG. 7 of the drawings against the stop 132 whereupon the deck boards 34 drop onto the stringers 56 in the proper predetermined position.

Referring now to FIGS. 7 and 10 there will be described the manner in which the power cylinder 50 is automatically controlled to deliver the proper number and spacing of deck boards on the stringers. The driven shaft 81 from the conveyor 106 is rotatably carried by means of the shaft bearings 83 and has formed on one end thereof a sproket 85. A second driven shaft 87 is rotatably carried by means of the shaft bearings 89 and is driven by means of a chain 91 through a mating sproket 93 formed on the shaft 87. The shaft 87 also has fixed thereon a removable cam 95 with a plurality of adjustable cleats 97 which are positioned on the cam 95 and are numbered in a predetermined manner so as to be able to control the operation of the power cylinder 50 as will be more fully detailed hereinafter. A micro switch 152 is mounted to be actuated by the plurality of cleats 97 and in turn controls the operation of the power cylinder 50 to control the number and position of deck boards supplied to the stringers.

The shaft 81 also has adjustably mounted thereon a plurality of cleats 99 and 101 which actuate respectively micro switch 148 and 150. The micro switch 148 is utilized to actuate the power cylinder 66 (FIG. 8) to deliver a predetermined supply of bulk stringers 56. At a later time, the micro switch 150 is utilized to actuate the power cylinder 72 to then deliver the stringers to the conveyor 106 which had previously been started by actuation of the main power switch (not shown) for the basic machine.

As the cam 95 rotates, the predetermined number of cleats 97 actuate the micro switch 152 to, in turn, actuate the power cylinder 50 at the proper time. The continued rotation of the shaft 81 actuates the micro switch 148 and 150 to continue to deliver the stringers in a predetermined manner. As the number of deck boards and stringers is changed, appropriate changes can be made in the respective cleats to adapt the machine to the new type and size of pallet or box.

After final adjustments have been made to the various cleats and adjustable switches, the basic machine will automatically form the partial pallet or complete pallet as required without the use of manual labor except as before noted where manual stapling is used to fix the deck boards to the stringers. It should become apparent that the basic machine as disclosed herein can be adapted by minor modifications to form other structures than pallets such as boxes, crates and the like without departing from the spirit and scope of the invention.

It should become apparent that many changes can be made in the structural arrangement of the machine and in the steps of the method disclosed herein without departing from the spirit and scope of the invention and the invention is not to be limited to the preferred embodiment which has been given by way of illustration only.

Having described my invention, I claim:

1. A component assembler comprising:
   a. a frame;
   b. a supply of stringers positioned on said frame;
   c. first means, associated with said frame, for feeding said stringers, said means also comprising means for positioning the stringers at a predetermined position in the assembler;
   d. a supply of deck boards positioned on said frame;
   e. second means, associated with said frame, for unscrambling said deck boards, said second means being positioned above said first feeding means; and
   f. means, associated with said frame, for positioning a predetermined number of deck boards on the positioned stringers at predetermined locations.

2. The component assembler as defined in claim 1 wherein said first means for feeding said stringers comprises an upwardly inclined stringer conveyor feeding the stringers one at a time into a stringer hopper and said means for positioning comprises a plurality of power cylinders.

3. The component assembler as defined in claim 2 wherein said second means for unscrambling said deck boards comprises at least one upwardly inclined deck board conveyor feeding the stringers one at a time into a first deck board hopper.

4. The component assembler as defined in claim 3 wherein said upwardly inclined deck board conveyor feeds the deck boards into a second deck board conveyor which, in turn feeds the deck boards into a second deck board hopper.

5. The component assembler as defined in claim 4 further comprising means, associated with said second deck board hopper for aligning the deck boards above the second deck board hopper in a predetermined position so that the deck boards may be dropped sequentially into the second deck board hopper.

6. The component assembler as defined in claim 5 wherein said means for aligning comprises a downwardly sloped guide chute having positioned therein a power operated gate for momentarily stopping the travel of the deck board and also aligning the deck board to a predetermined position for dropping into the second deck board hopper.

7. The component assembler as defined in claim 6 wherein said means for positioning the deck boards on the stringers comprises a power cylinder having formed thereon at least one pusher for pushing the deck boards out of the second deck board hopper into position on the stringers.

8. A pallet assembly line comprising:
   a. a frame;
   b. a supply of stringers positioned on said frame;
   c. means, associated with said frame for feeding said stringers; said means also comprising means for positioning the stringers at a predetermined position in the assembler;
   d. a first supply of deck boards positioned on said frame;
   e. means, associated with said frame, for unscrambling said first supply of deck boards, said means being positioned above the stringers;
   f. means, associated with said frame, for positioning a predetermined number of deck boards on the stringers;
   g. means, associated with said frame, for fastening said deck boards to said stringers thereby forming a partial pallet;
   h. means, associated with said frame, for turning over said partial pallet and for transporting said turned over partial pallet to a second pallet component assemblier;
   i. a second supply of deck boards positioned on said frame;
   j. means, associated with said frame, for unscrambling said second supply of deck boards, said means being positioned above the partial pallet;
   k. means, associated with said frame for positioning a pre-determined number of deck boards on the partial pallet; and
   l. means, associated with said frame for fastening said deck boards to said partial pallet thereby forming a completed pallet.

9. The pallet assembly line as defined in claim 8 further comprising:
   m. means associated with said frame, for transporting said completed pallet to a pallet stacker;
   n. a pallet stacker, associated with said frame, for stacking said completed pallets to a pre-determined height;
   o. means, associated with said frame, for transporting said stacked pallets to a transportation vehicle.

10. A method of assembling a partial pallet in an assembly line comprising:
    a. providing a supply of pallet stringers;

b. automatically supplying said stringers to the assembly line;
c. providing a supply of pallet deck boards;
d. automatically unscrambling said deck boards in the assembly line;
e. automatically positioning a pre-determined number of stringers in the assembly line;
f. automatically positioning a pre-determined number of deck boards on the positioned stringers; and
g. fastening said deck boards to said positioned stringers to thereby provide a partial pallet.

11. An automatic assembler comprising:
a. a frame;
b. a supply of board receivers positioned on said frame;
c. first means, associated with said frame, for feeding said board receivers, said means also comprising means for positioning the board receivers at a pre-determined position in the assembler;
d. a supply of boards positioned on said frame;
e. second means, associated with said frame, for unscrambling said boards, said second means being positioned above said first feeding means; and
f. means, associated with said frame, for positioning a pre-determined number of boards on the positioned board receivers at pre-determined locations.

* * * * *